Patented Sept. 17, 1935

2,014,790

UNITED STATES PATENT OFFICE 2,014,790

COMPOUND OF THE ANTHRAQUINONE-ACRIDONE SERIES AND PROCESS OF PREPARING THE SAME

Robert Fraser Thomson, William Smith, and James Primrose, Grangemouth, Scotland, assignors to Imperial Chemical Industries Limited, a corporation of Great Britain No Drawing. Application October 14, 1931, Serial No. 568,862. In Great Britain October 18, 1930

12 Claims. (Cl. 260—37)

This invention relates to the manufacture of anthraquinone derivatives particularly of anthraquinoneacridones and of intermediate compounds therefor.

The condensation of 1-halogenoanthraquinone-2-carboxylic acid and its derivatives (e. g. mononitrated 1 - chloroanthraquinone - 2 - carboxylic acid, monoclorinated 1-chloroanthraquinone-2-carboxylic acid, and 1:4-dichloroanthraquinone-2-carboxylic acid) with arylamines, and the conversion of the products into anthraquinone-acridones, are described in British specification No. 894/1911, and the use of the corresponding 1-halogenoanthraquinone-2-carboxylic esters in similar condensation and acridonation is the subject of British specification No. 8230/1912. More recently there has been described in British specifications Nos. 311,283 and 314,899 the condensation of anthraquinone-acridones carrying, besides halogen in the benzene ring, a halogen atom in position 4 of the anthraquinone nucleus, with aminoanthraquinones and with arylamines of the benzene or naphthalene series, respectively.

Methods are known for the replacement of halogen in halogenated anthraquinones by condensation with arylsulphonamides (see British specification No. 8109/1915) or with dicarboxylic acid imides (see British specificaton No. 214,765) so as to produce on subsequent hydrolysis aminoanthraquinones.

In this state of the prior art researchers have been made and we have discovered that anthraquinone-1:2-acridones of the formula

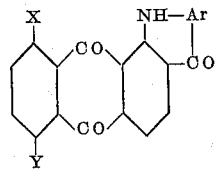

wherein Ar is an o-arylene residue of the benzene naphthalene or anthracene series (which may if desired carry substituents), and X and Y are amino- or substituted amino groups, have very valuable properties, partly as vat dyes themselves, partly as intermediate products for the manufacture of other dyes.

It is an object of this invention, therefore, to provide compounds of the above structure. It is a further object of the invention to provide intermediate products suitable for the manufacture of compounds of that structure. A further object is to provide other dyes which can be made from the said compounds. Another object of the invention is to provide dyes of enhanced beauty and depth of shade than the anthraquinone-1:2-acridones in which the substituents X and Y in the above formula are absent. Other objects will appear as the specification proceeds.

These objects are achieved by the following invention. We use as starting-material 1:5:8-trichloro-2-methylanthraquinone, which we have found can be oxidized smoothly by means of manganese dioxide in a sulphuric acid medium to give 1:5:8-trichloroanthraquinone-2-carboxylic acid. In order to obtain commercially useful yields of this acid it is necessary to use manganese dioxide in sulphuric acid as the oxidant, and it is advantageous to work at a temperature of about 70° C.

The next step is to condense the trichloro-acid with an arylamine of the benzene, naphthalene or anthracene series, whereby the chlorine in position 1 is replaced by the arylamino-group. This condensation is effected in the usual manner, e. g. in presence of an acid-absorber and a copper catalyst. Amongst suitable arylamines may be mentioned aniline, β-naphthylamine, aminoanthraquinones, aminobenzoyl-o-benzoic acids, etc. The products from aminobenzoyl-o-benzoic acids may of course subsequently be cyclized by treatment with sulphuric acid so as to give products identical with those obtained from the corresponding aminoanthraquinones.

The substances resulting from the foregoing operations have the structure:

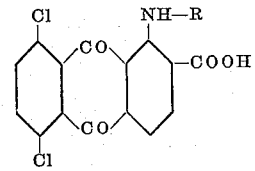

wherein R stands for an aryl group of the benzene, naphthalene or anthracene series, which may if desired carry substitutes.

These substances are now converted by customary means, e. g. by treatment with sulphuric acid, into acridones of the formula

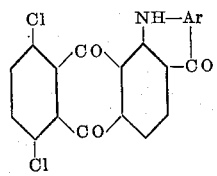

wherein Ar stands for an o-arylene-residue of the benzene, naphthalene or anthracene series, which may if desired carry substituents. The acridones so obtained are vat dyes.

The next step in the series of operations is the condensation of these acridones, having chlorine in positions 5 and 8 in the anthraquinone nucleus, with amines or substituted amines containing replaceable hydrogen so as to give the very valuable vat dyes of the structure shown in the formula first set out above.

These products may in some cases be converted into further products having valuable vat dyeing properties. Thus if the amino groups X and/or Y carry carboxylic acid groups in ortho position to the amino nitrogen atom, a treatment with sulphuric acid closes further acridone rings, the reaction being represented in the case of the 5:8-di(o-carboxyanilino)-compound by the formulæ:

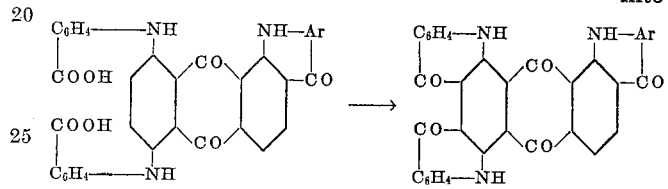

Or, if X and/or Y represent anthraquinonyl-amino-groups, a treatment with aluminium chloride or similar reagent (e. g. sodium aluminium chloride, ferric chloride, etc) converts the product into what is probably a carbazole derivative. According to present knowledge such a reaction in the case of the 5:8-di-α-anthra-quinonylamino derivative would probably lead to a compound of structure:

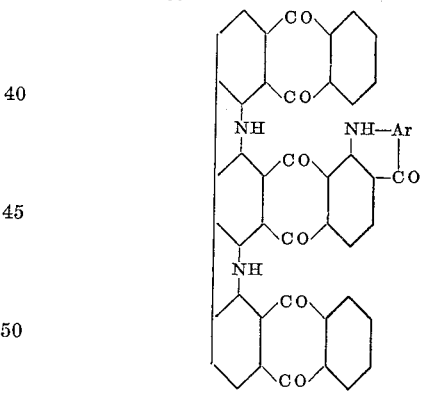

or to a compound in which one only of the carbazole rings has been closed. Or the acridone may be nitrated and reduced, and the resulting amino group may be acylated, e. g. benzoylated. When the dichloroacridone has been condensed with acid amides the product already contains acylated amino groups; such products may be hydrolyzed and a different acyl group introduced.

The following examples, which are given by way of illustration only and are in no sense limitative, serve to explain more fully certain embodiments of the invention.

*Example 1*

This example describes the preparation of one of the starting materials for our process, 1:5:8-trichloroanthraquinone-2-carboxylic acid.

30 parts of 2-(4'-methylbenzoyl)-3:6-dichlorobenzoic acid and 500 parts of 5% oleum are heated at 90° C. for one hour. The temperature of the solution is then raised to 105° C. and maintained there till ring-closure is complete. This generally takes about 3 hours. The dark brown solution is then cooled and water carefully added to reduce the strength of the acid to 80% $H_2SO_4$, after cooling to room temperature the pale yellow crystals which separate are filtered on asbestos, washed with 80% sulphuric acid till the filtrates are colourless and then with water till free of acid. The pale yellow material obtained in this way melts at 246–248.5° C. and consists of 2-methyl-5:8-dichloranthraquinone.

20 parts of 2-methyl-5:8-dichloro-anthraquinone are dissolved in 200 parts of 5% oleum. The solution is cooled to 3–5° C. and chlorine gas passed into the solution until the required increase in weight for the introduction of one atom of chlorine is obtained. A small sample is then withdrawn from the melt and tested, if it shows the correct amount of chlorine the whole is poured into 2000 parts of water and the pale yellow 1:5:8-trichloro-2-methyl-anthraquinone filtered off and washed acid free with water.

15 parts of 1:5:8-trichloro-2-methyl-anthraquinone are dissolved in 330 parts of concentrated sulphuric acid and the solution heated to 68–72° C. 36 parts of finely ground manganese dioxide are then added over 3 hours. After the addition of the manganese dioxide is complete the mixture is heated a further eleven hours at 69–72° C. It is then cooled, poured into 2000 parts of water and filtered. The cake after washing free of acid is taken up with a solution of 10 parts of sodium carbonate in 200 parts of water and solution so obtained filtered to remove any unchanged manganese dioxide. The filtrates are then made acid with hydrochloric acid, cooled and filtered. The carboxylic acid is washed free from mineral acid and dried.

*Example 2*

9 parts of 1:5:8-trichloro-anthraquinone-2-carboxylic acid, 9 parts of β-napthylamine, 8 parts of potassium acetate, 0.5 part of copper acetate and 180 parts of amyl alcohol are heated under a reflux condenser for 2½ hours. The violet reaction mass is filtered hot, well pressed and taken up with dilute hydrochloric acid, boiled and filtered.

*Example 3*

9 parts of 1-β-naphthylamino-5:8-dichloro-anthraquinone-2-carboxylic acid obtained as described above are heated with 45 parts of dry nitrobenzene and 6.5 parts of acetic anhydride at 90–95° C. for 2½ hours. The solution obtained is cooled to 30° C. and 1.84 parts of concentrated sulphuric acid dripped in. The solution is warmed to 100–105° C. for 2 hours, cooled and filtered, washed with nitrobenzene and methylated spirits. The 5:8-dichloranthraquinone-2:1(β)-naphthacridone dyes cotton yellowish red shades from a purple vat.

*Example 4*

25 parts of phthalic anhydride and 7 parts of potassium carbonate are heated to 200° C. for 30 minutes, 4.6 parts of 5:8-dichloro-anthraquinone-2:1(β)-naphthacridone, 10 parts of phthalimide and 0.1 part of copper powder are then added and the whole heated to 220° C. till reaction is complete. The melt is poured into 1000 parts of water, boiled and filtered.

The residue is further extracted with boiling water if necessary, until all the phthalic acid and phthalimide have been removed.

The product dyes cotton mauve shades from a blue alkaline hydrosulphite vat.

Example 5

7 parts of 5:8-diphthalimidoanthraquinone-2:1($\beta$)-naphthacridone obtained as described above are heated with 70 parts of concentrated sulphuric acid at 100° C. for 1 hour. The solution is cooled and poured into water. The precipitated 5:8 - diaminoanthraquinone - 2:1($\beta$)-naphthacridone is a dark bluish green solid. It is filtered and washed free. It dyes cotton a greenish-blue shade from a purple vat.

Benzoylation gives a product dyeing in redder shades.

Example 6

5 parts of 5:8-dichloroanthraquinone-2:1($\beta$)-naphthacridone are heated with 50 parts aniline and 0.1 part of copper powder at 185 C. for 16 hours. After cooling the dark green body is filtered off, washed with aniline and methylated spirit. It dissolves in concentrated sulphuric acid with a red colour and dyes cotton in fast green shades from a purple vat.

Example 7

2 parts 5:8 - dichloroanthraquinone - 2:1($\beta$) - naphthacridone and 30 parts of a 40% solution of methylamine are heated in a sealed glass tube at 120° C. for 16 hours. The reaction mixture is poured into dilute hydrochloric acid and the dimethyl-amino compound filtered off and washed with water till free of acid. It dyes cotton in bluish red shades from a blue vat. The colour of the solution obtained by dissolving it in sulphuric acid is orange.

Example 8

3 parts 5:8 - dichloro - 1 - $\beta$ - naphthylaminoanthraquinone - 2 - carboxylic acid, 5.8 parts anthranilic acid, 2.9 parts potassium carbonate, 24 parts methyl alcohol and 0.24 parts copper powder are heated in a copper autoclave at 180° C. for 16 hours. A clear green solution is obtained when the contents of the autoclave are poured into water. The solution is acidified and the material precipitated filtered off and well washed with water till free of alcohol and acid. The compound obtained is essentially 5:8-dianthranilido-1-$\beta$ - naphthylaminoanthraquinone-2-carboxylic acid. It is deep green in color and dissolves in sulphuric acid to give a reddish blue solution.

Example 9

This example describes the first stage of the cyclization of the product obtained as described in Example No. 8.

3 parts of the product of Example No. 8, 15 parts of dry nitrobenzene and 3 parts of acetic anhydride are heated at 95° C. for 1½ hours. After cooling to about 40° C. 0.5 parts of concentrated sulphuric acid are dropped in and the mixture heated to 100° C., and maintained at that temperature for 2 hours. The melt is cooled and then filtered, washed with nitrobenzene and methylated spirits and dried. It is soluble in alkali and dyes cotton in feeble bluish green shades.

Example 10

This example describes the completion of the cyclization of the product from Example 9.

1 part of the product from Example 9 and 16 parts of 96% sulphuric acid are heated to 100° C. for 30 minutes. After cooling the acid strength is reduced to 70% by the addition of crushed ice. The mixture is allowed to stir cold for some time and then filtered on a porous tile, washed with 70% sulphuric acid and then with water till free of acid. The dyestuff obtained dissolves in sulphuric acid to give a blue solution. It dyes cotton in blue shades from a blue vat.

Example 11

2 parts of 5:8-dichloranthraquinone-2:1($\beta$)-naphthacridone, 3.5 parts of 1-amino-5-benzoylamino-anthraquinone, 2.2 parts of sodium carbonate, 0.2 part of copper chloride and 50 parts of nitrobenzene are heated with good stirring at 205-208° C. for 10 hours, and then allowed to cool to 160° C. and filtered. The cake obtained is well washed with nitrobenzene, methylated spirits and hot water. A dark green body is obtained which appears to be substantially 5:8-di-(5'-benzoylaminoanthraquinonyl - 1 - amino)-anthraquinone-2-1($\beta$)-naphthacridone. It dissolved in sulphuric acid to give a red solution. Cotton is dyed a greenish grey shade from a purple vat by the dyestuff.

Example 12

This example describes the formation of what is probably a carbazole from the compound described under Example 11.

2 parts of the product from Example 11, and 40 parts concentrated sulphuric acid are stirred together at laboratory temperature for 3 hours. 2 parts of sodium perborate are then added and the solution stirred for a further hour. The solution becomes much darker in colour. It is poured on to ice and the precipitate filtered off, washed acid free and dried. It dyes cotton in greenish grey shades of good fastness properties.

Example 13

4 parts 5:8-dichloroanthraquinone - 2:1($\beta$)-naphthacridone, 4 parts 1-aminoanthraquinone, 2.6 parts sodium carbonate, 0.5 part copper chloride and 40 parts of nitrobenzene are heated at 207-212° C. for 16 hours. The melt is cooled to 80° C., filtered and washed with cold nitrobenzene and with methylated spirits. Excess of soda ash is removed by extracting with boiling water. The product is a useful vat dyestuff, dyeing cotton in bluish grey shades from a purple vat.

Example 14

This example describes the formation of what is probably a carbazole from the compound obtained as described in Example 13.

4 parts of the product of Example 13 is added carefully to a mixture of 8 parts aluminium chloride and 10 parts of dry pyridine. The mixture is warmed to 100° C. and then to 125° C.–130° C. for one hour, after which it is poured into dilute hydrochloric acid. After standing over night the black precipitate obtained is filtered off and washed free of acid. It dyes cotton in grey shades from a purple vat.

Example 15

2 parts of the product prepared in Example No. 14 are added to a mixture of 20 parts concentrated sulphuric acid and 2 parts of boric acid and when solution is complete a mixture of 1.84 parts concentrated sulphuric acid and 1.5 parts concentrated nitric acid is dripped in while the temperature is kept below 20° C. The mixture is stirred at 20° C. for 12 hours and then poured into 200 parts of cold water. A black precipitate is obtained which is filtered off, washed acid free and dried.

Example 16

This example describes the reduction of the product from Example No. 15.

2 parts of the product from Example No. 15, 20 parts of water and 3 parts of sodium sulphide are boiled gently for two hours, cooled, filtered and washed free of alkali. The dyestuff obtained dyes cotton in bluish grey shades from a purple vat. The amino body can be benzoylated when a dye-stuff which dyes cotton in grey shades from a purple vat is obtained. The shade is less blue than that from the amino compound.

Example 17

This example describes the preparation of a tetra-amino-anthraquinone-naphthacridone.

3.5 parts of the body obtained as described in Example 4 are added to 30 parts of concentrated nitric acid which is kept cold by means of a surrounding water bath. The mixture is allowed to stir for 1½ hours and then poured into water. A pale orange precipitate is obtained. This is filtered off, washed acid free and dried. The material dissolves in concentrated sulphuric acid.

4 parts of the nitro-phthalimidonaphthacridone are dissolved in 40 parts of sulphuric acid and the solution warmed to 100° C. for one hour. After cooling the solution is poured into water when a dark brown precipitate is obtained. The precipitate is filtered off and washed free of acid.

The paste is taken up with 200 parts water and 3 parts sodium sulphide added. The mixture is boiled for two hours and then air blown for 36 hours. A dark green body separates and is filtered off, washed free of alkali, dried. The material obtained is substantially tetra-amino-anthraquinonenaphthacridone. It dyes cotton in bright green shades from a deep purple vat.

When benzoylated a body dyeing in blue green shades is obtained.

Example 18

1 part of 1:5:8-trichloro-anthraquinone-2-carboxylic acid obtained as described in Example No. 1, 2 parts of aniline, 2 parts of sodium carbonate, 0.5 part of copper sulphate and 30 parts of water are heated under a reflux condenser for 6 hours. The brown solution rapidly becomes deep red. It is poured on to ice and the solution made slightly acid with hydrochloric acid. After standing a short time the precipitate obtained is filtered off, washed free of mineral acid and dried. It is a dark red body and gives an orange solution in concentrated sulphuric acid, and when 40% formaldehyde solution is carefully added to this solution, an intense green colour at once develops.

Example 19

5 parts of the product described in Example 18 are heated with 50 parts of concentrated sulphuric acid in a water bath at 100° C. for 1 hour. The solution is poured into water and the precipitate filtered off, washed free of acid and dried. The material, which is substantially 5:8-dichloro-anthraquinone-2:1-benzacridone is a dark brown body and dyes cotton in pink shades from a brown vat.

Example 20

10.7 parts of 1:5:8-trichloroanthraquinone-2-carboxylic acid, 7.6 parts of 4'-methyl-3'-aminobenzoyl-2-benzoic acid, 16 parts of soda ash, 1 part of copper sulphate and 100 parts of water are heated together for 16 hours in a salt bath at 103°–105° C. The reaction mixture is poured into 500 cc. water and any insoluble matter filtered off. The filtrates are acidified with dilute hydrochloric acid and after standing some time the precipitate obtained is filtered off, washed free of acid and dried. It is a purple coloured material and gives a brown solution in concentrated sulphuric acid. When 40% formaldehyde solution is added to this solution an intense bluish green colouration is obtained.

Example 21

7 parts of the product described in Example 20 are heated with 70 parts of 100% sulphuric acid at 135° C. for 2½ hours. The solution is cooled, poured on to ice and the precipitate obtained filtered off, washed free of acid and dried. The product, which is a dark brown body, dyes cotton in orange shades from a deep violet coloured vat. It appears to be a dichloroanthraquinoneacridone of probable formula:

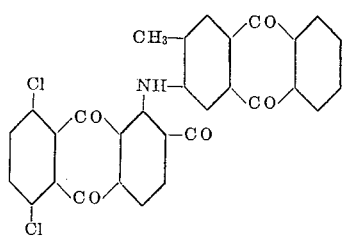

Example 22

This example describes the formation of a derivative of the product obtained in Example 21.

20 parts of the product from this example, 300 parts of phthalic anhydride, 50 parts of phthalimide, 40 parts of potassium carbonate and 1 part of copper powder are heated together at 220° C., for 18 hours. The melt is poured into 3000 parts water and the mixture boiled to dissolve the phthalic acid and unchanged phthalimide and filtered at the boil. The extraction is repeated till all the phthalic acid is removed. The diphthalimido compound is dried and 15 parts are dissolved in 300 parts of concentrated sulphuric acid. The solution is warmed to 100° C. for 1 hour, cooled and poured into 3000 parts of cold water. An almost black material is precipitated and is filtered off, washed free of acid and dried. It dyes cotton in dark grey shades from a reddish brown vat.

If the amino body is benzoylated a product, dyeing in bluish red shades, is obtained.

It is apparent that our invention is capable of wide application and variation both as to the nature of the amino groups X and Y (in the formula set out first above) and as to the nature of the o-arylene residue Ar. Moreover the diaminoanthraquinoneacridones when obtained may be submitted, as hereinbefore explained, to a variety of further treatments.

As many apparently and widely different embodiments of this invention may be made without departing from the spirit and scope thereof, it is to be understood that we do not limit ourselves to the specific embodiments thereof except as defined in the appended claims. By the expression "amine groups" as used in the following claims, we mean to include the group —NH$_2$ itself or where one or both of the hydrogen atoms of such group are substituted by alkyl, aryl or acidyl radicals, the acidyl radicals being from either mono- or di-carboxylic acids.

We claim:

1. In the process of manufacturing vat dyestuffs the step which comprises condensing a dichloro-anthraquinone-acridone compound of the general formula:

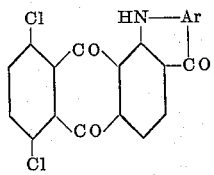

wherein Ar stands for an o-arylene radical of the benzene, naphthalene and anthracene series, with an amine compound of the primary and secondary series whereby to replace the chlorine atoms by amino groups.

2. In the process of manufacturing vat dyestuffs, the step which comprises condensing with phthalimide a dichloro-anthraquinone-acridone of the general formula:

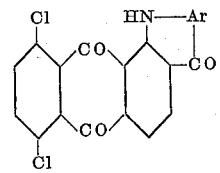

wherein Ar stands for an o-arylene radical of the benzene, naphthalene and anthracene series.

3. In the process for the manufacture of vat dyestuffs, the steps which comprise condensing phthalimide with a dichloro-anthraquinone-acridone of the general formula:

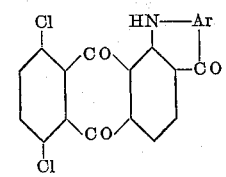

wherein Ar stands for an o-arylene radical of the benzene, naphthalene and anthracene series, and hydrolyzing the resulting diphthalimido compound to produce the crorresponding diamine.

4. A process for the manufacture of vat dyestuffs, which comprises condensing with phthalimide a dichloro-anthraquinone-acridone of the general formula:

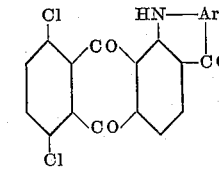

wherein Ar stands for an o-arylene radical of the benzene, naphthalene and anthracene series, hydrolyzing the resulting diphthalimido compound, and treating the diamino body thus produced with a benzoylating agent.

5. In the process of manufacturing vat dyestuffs, the step which comprises condensing 5,8-dichloro-anthraquinone-2,1-(β)-naphthacridone with an amine compound of the primary and secondary series, under conditions leading to replacement of both chlorine atoms by amino group.

6. A process for the manufacture of vat dyestuffs which comprises condensing 5,8-dichloro-anthraquinone - 2,1 - (β) - naphthacridone with phthalimide to produce 5,8-diphthalimido-anthraquinone-2,1-(β)-naphthacridone, and hydrolyzing the latter body to produce the free diamine.

7. A process for the manufacture of vat dyestuffs which comprises condensing 5,8-dichloro-anthraquinone - 2,1 - (β) - naphthacridone with phthalimide to produce 5,8-diphthalimido-anthraquinone-2,1-(β)-naphthacridone, hydrolyzing the latter body to produce the free diamine, and treating the latter body with a benzoylating agent.

8. A compound of the anthraquinone-acridone series corresponding to the general formula:

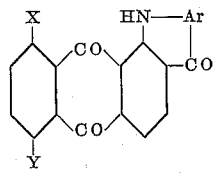

where Ar represents an o-arylene radical of the benzene, naphthalene and anthracene series, and wherein X and Y represent amine groups.

9. A compound of the anthraquinone-acridone series corresponding to the general formula:

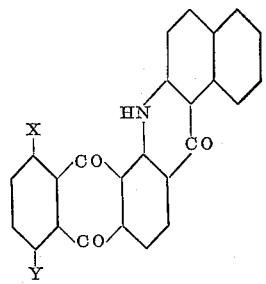

wherein Ar represents on o-arylene radical of the

10. A compound of the anthraquinone-acridone series corresponding to the general formula:

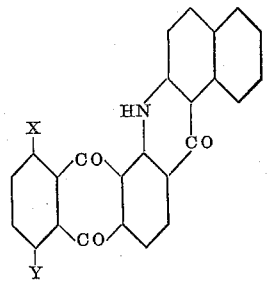

wherein X and Y represent alkylamino groups.

11. 5,8 - di(benzoylamino) - anthraquinone - 2,1-(β)-naphthacridone.

12. 5,8 - di - (methylamino) - anthraquinone-2,1-(β)-naphthacridone.

ROBERT FRASER THOMSON.
WILLIAM SMITH.
JAMES PRIMROSE.

CERTIFICATE OF CORRECTION.

Patent No. 2,014,790.

September 17, 1935.

ROBERT FRASER THOMSON, ET AL.

It is hereby certified that error appears in the printed specification of the above numbered patent requiring correction as follows: Page 1, first column, line 8, for "monoclorinated" read monochlorinated; line 31, for the word "researchers" read researches; and second column, line 43, for "substitutes" read substituents; page 5, first column, line 54, claim 3, for "crorresponding" read corresponding; and second column, line 49, claim 9, strike out "wherein Ar represents on o-arylene radical of the" and insert instead the words and period wherein X and Y represent amine groups.; and that the said Letters Patent should be read with these corrections therein that the same may conform to the record of the case in the Patent Office.

Signed and sealed this 16th day of February, A. D. 1937.

(Seal)

Henry Van Arsdale
Acting Commissioner of Patents.